(12) United States Patent
Sanguinet et al.

(10) Patent No.: US 8,579,164 B1
(45) Date of Patent: Nov. 12, 2013

(54) DISPENSING BOWL ATTACHMENT FOR USE WITH A BOTTLE

(75) Inventors: Andrew Sanguinet, Oak Park, IL (US); Brett Niggel, Corry, PA (US); Scott Jost, Glen Ellyn, IL (US)

(73) Assignee: Berlin Packaging, LLC, Chicago, IL (US)

( * ) Notice: Subject to any disclaimer, the term of this patent is extended or adjusted under 35 U.S.C. 154(b) by 0 days.

(21) Appl. No.: 13/613,962

(22) Filed: Sep. 13, 2012

(51) Int. Cl.
*B65D 37/00* (2006.01)

(52) U.S. Cl.
USPC .............................. 222/207; 222/205; 222/211

(58) Field of Classification Search
USPC ......... 222/211, 444, 454–455, 546, 562, 207, 222/205; 220/254.3
See application file for complete search history.

(56) References Cited

U.S. PATENT DOCUMENTS

| | | | | |
|---|---|---|---|---|
| 2,603,387 A * | 7/1952 | MacPhee | ...................... | 222/205 |
| 3,089,623 A * | 5/1963 | Padzieski | ...................... | 222/205 |
| 3,246,807 A * | 4/1966 | Micallef | ...................... | 222/207 |
| 4,183,450 A * | 1/1980 | Downing et al. | ............. | 222/455 |
| 4,660,746 A * | 4/1987 | Wright | ...................... | 222/207 |
| 5,244,113 A * | 9/1993 | Stymiest | .................... | 220/710.5 |
| 5,261,569 A * | 11/1993 | Sandwell | ...................... | 222/205 |
| 5,330,081 A * | 7/1994 | Davenport | .................... | 222/207 |
| 5,833,124 A * | 11/1998 | Groves et al. | .................. | 222/158 |
| 6,923,344 B1 * | 8/2005 | Chien | ............................. | 222/158 |
| 2005/0056660 A1* | 3/2005 | Anderson et al. | ................. | 222/1 |
| 2010/0240757 A1* | 9/2010 | Meehan et al. | ............... | 514/567 |

* cited by examiner

*Primary Examiner* — Kevin P Shaver
*Assistant Examiner* — Robert Nichols, II
(74) *Attorney, Agent, or Firm* — Adam K. Sacharoff

(57) ABSTRACT

In one embodiment there is provided a bowl attachment for use in connection with a bottle having a threaded opening and configured to contain a fluid. The bowl attachment includes a main bowl portion and a cover portion. The main bowl portion has a thread connection to secure to the bottle neck. A wall extends from the connection section and is shaped as a bowl. An interior spout is connected to the thread connection section and permits fluid from the bottle to squeeze into the main bowl portion. A cover portion is secured to the main bowl portion and includes an aperture with a flip top lid.

6 Claims, 6 Drawing Sheets

DISPENSING BOWL ATTACHMENT FOR USE WITH A BOTTLE

FIELD OF THE INVENTION

The present invention relates to a bowl configured to be attached to a bottle and used to dispense fluid contents squeezed from the bottle into the bowl.

BACKGROUND OF THE INVENTION

Fluids are often sold to consumers in a variety of different types of containers. The bottles can then be designed so the consumer can squeeze or tilt the bottle to eject the fluids. Depending on the thickness of the fluids, for example shampoos, which have a higher viscosity then water, are more difficult to eject from a bottle by simply tilting the bottle. Bottles with higher viscosity fluids often have to be squeezed, shook upside down, or hit by the consumer's hand to help eject the fluids. This can lead to a large quantity or greater then needed quantity of fluid being ejected all at once. The aid with the ejection of fluid, whether it be a higher viscosity or low viscosity fluid, the present invention provides for a bowl configured to be attached directly to the neck of the bottle, which permits the bottle to be squeezed such that the a specific amount of fluid can be moved from the bottle to the bowl. Other advantages over the prior art will be described below.

SUMMARY OF THE INVENTION

In one embodiment of the present invention there is provided a bowl attachment for use in connection with a bottle having a threaded opening and configured to contain a fluid. The bowl attachment includes a main bowl portion and a cover portion. The main bowl portion has a connection section configured with a threaded section to secure to the threaded opening of the bottle. The main bowl portion further has a continuous wall section extending upwardly from a lower portion of the connection section and is shaped as a bowl. The continuous wall section further includes an upper terminus end with a lip bulging inwardly into the bowl. An interior well is provided and connected to an upper portion of the connection section. Positioned within the interior well is a spout with a hollow interior such that contents of the bottle is capable of entering the main bowl portion through the spout.

The cover portion has a lower section with a lower extending skirt portion. The lower extending skirt portion includes a bead defined to snap fit below the lip of the upper terminus end of the continuous wall section. The lower section also has an annular ring extending outwardly therefrom to lay adjacently over the upper terminus end of the continuous wall section. The cover portion further includes a top section with an aperture positioned there through and a hinged flip top lid having an annular downwardly extending flange to frictionally engage the aperture when the flip top lid is in a closed position. In other embodiments, the cover portion may also include a protruding member extending downwardly from an interior surface of the top section and aligned over the spout.

In other aspects of the embodiment, the upper portion of the connection section may include a first rim extending inwardly to connect to the interior well and the interior well may include a second rim extending inwardly to connect to a lower portion of the spout.

In yet other aspect of the embodiments the bowl attachment may also include a handle having a pair of terminal ends, each end being pivotally connected to the cover portion such that the handle is pivotally secured to the cover portion. Additionally, the cover portion may including a ledge grooved into the upper portion of the cover portion and a pair of tabs extending outwardly at a position adjacent the ledge. The handle would include a pair of terminal ends, each end including a detent sized to receive one of the tabs, such that when the handle is connected the handle may pivot about the tabs and lay in a rest position against the ledge.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE DRAWINGS

Figure 1:
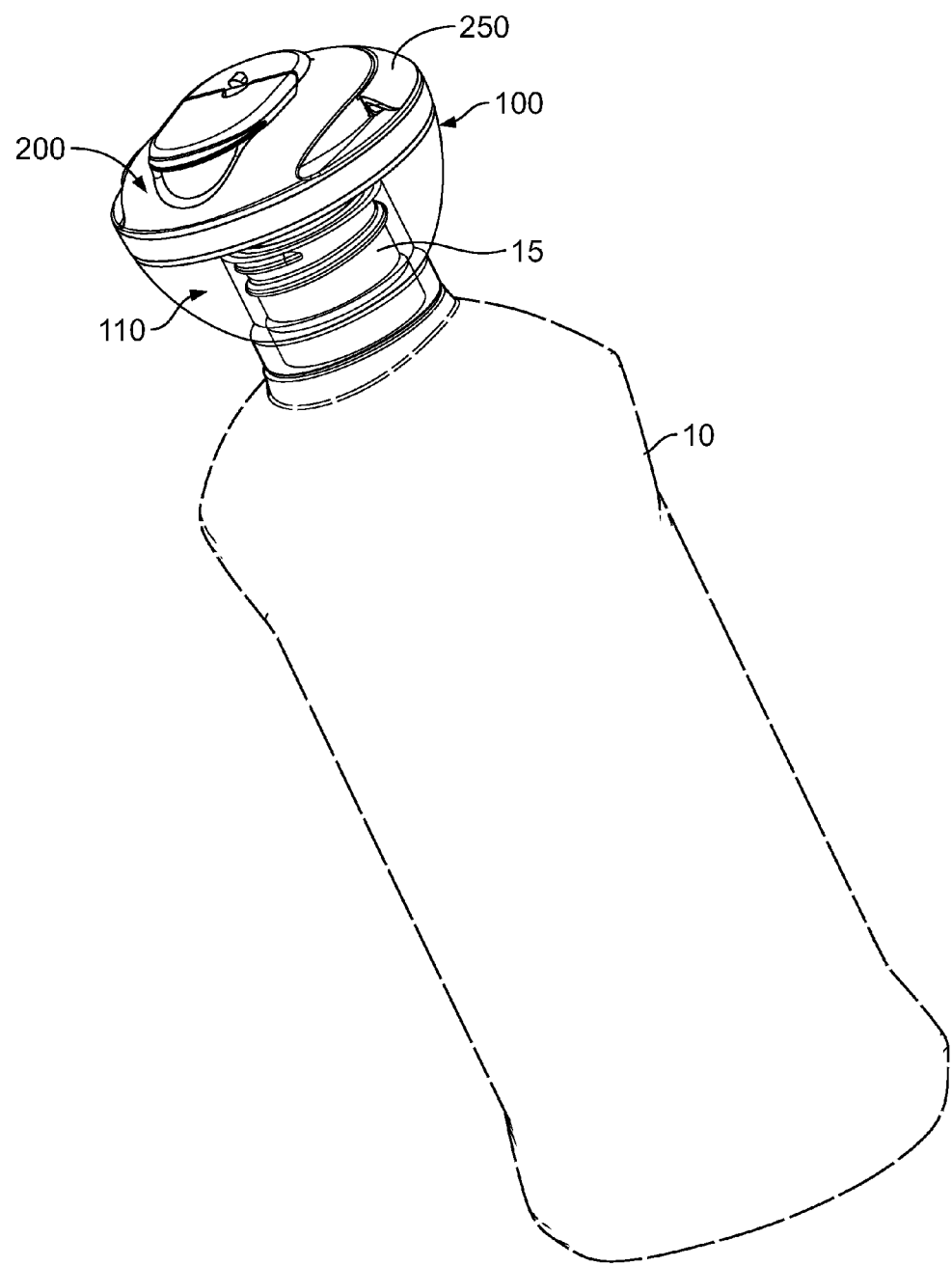
FIG. 1 is a perspective view of a bottle and bowl attachment in accordance with an embodiment of the present invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Referring now to FIG. 1, there is shown a bottle 10 with a bowl attachment 100 in accordance with an embodiment of the present invention. The bottle 10 could be any type of typical bottle used to contain a fluid. The bottle 10 includes a threaded neck 15 that contains an opening to the inside of the bottle. Fluid is ejected from the bottle 10 through the opening in the neck 15.

Referring now also to FIGS. 2-7B, there is shown in various embodiments and illustrations a bowl attachment 100. The bowl attachment 100 includes at least two component pieces, the main bowl portion 110 and a cover portion 200 that is shown to be separable from the main bowl portion 110. Securing the cover portion 200 to the main bowl portion 110 may be accomplished by a snap fit (as shown in the figures) or corresponding threaded means (not shown, but well known in the industry). In addition, a third component piece may be provided. A pivotal handle 250 may be secured to the cover portion 200. The pivotal handle 250 may move from a resting position against the cover portion 200 to an upright position that permits a consumer to hold onto the bowl attached 100 when assembled.

Figure 2:
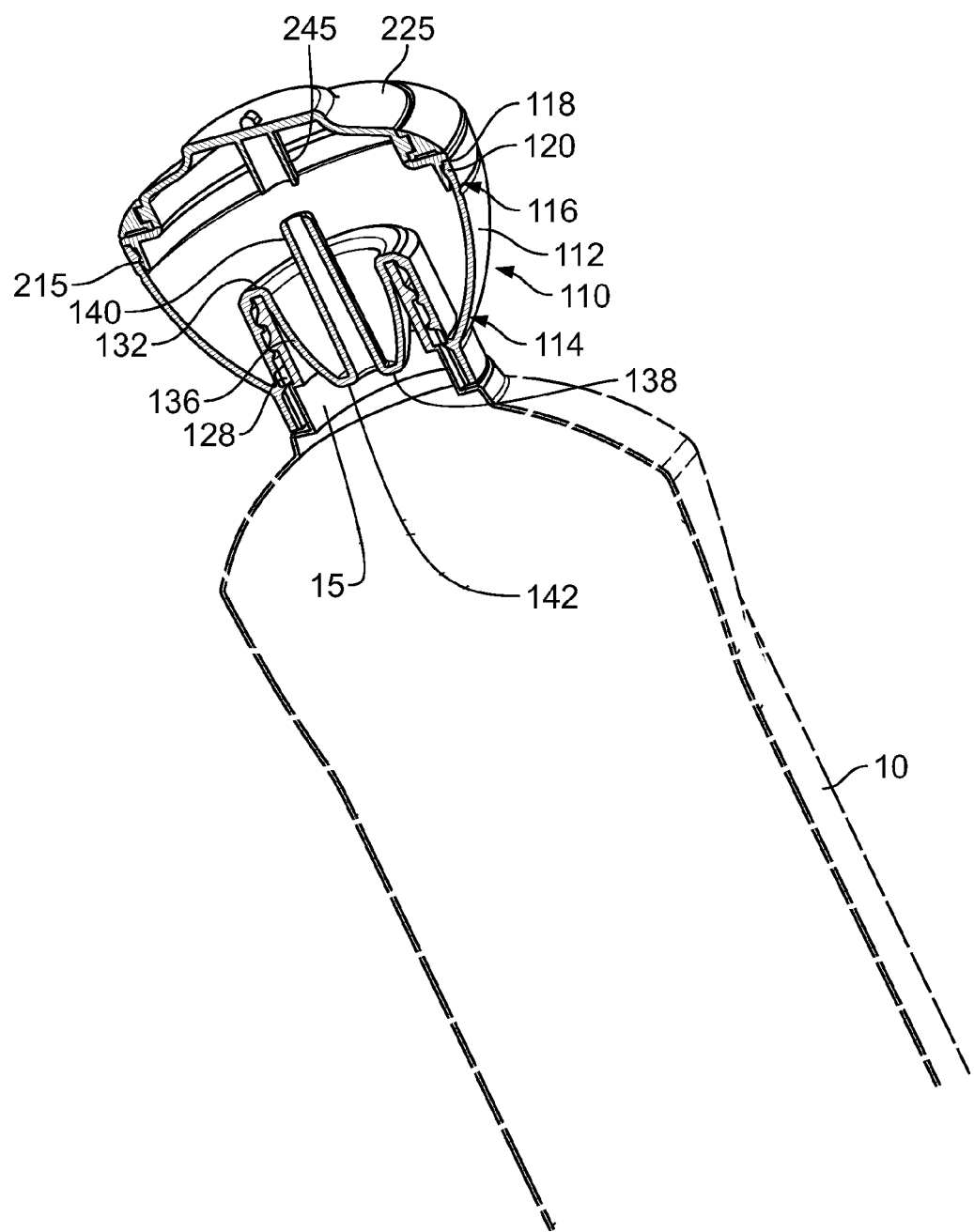
FIG. 2 is a cross sectional view of a bottle and bowl attachment in accordance with an embodiment of the present invention.
Figure 3:
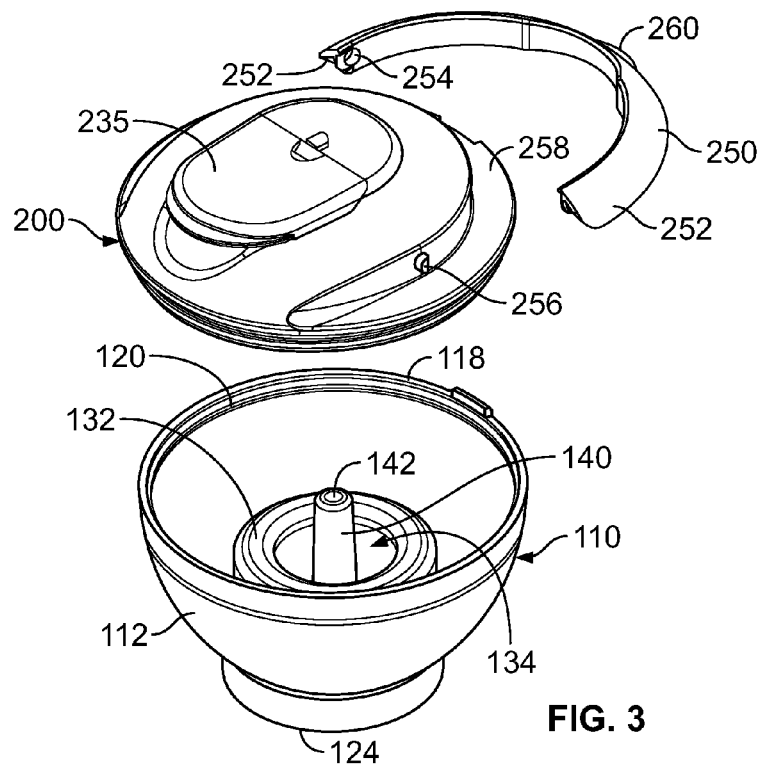
FIG. 3 is an exploded view of the bowl attachment in accordance with an embodiment of the present invention.
Figure 4:
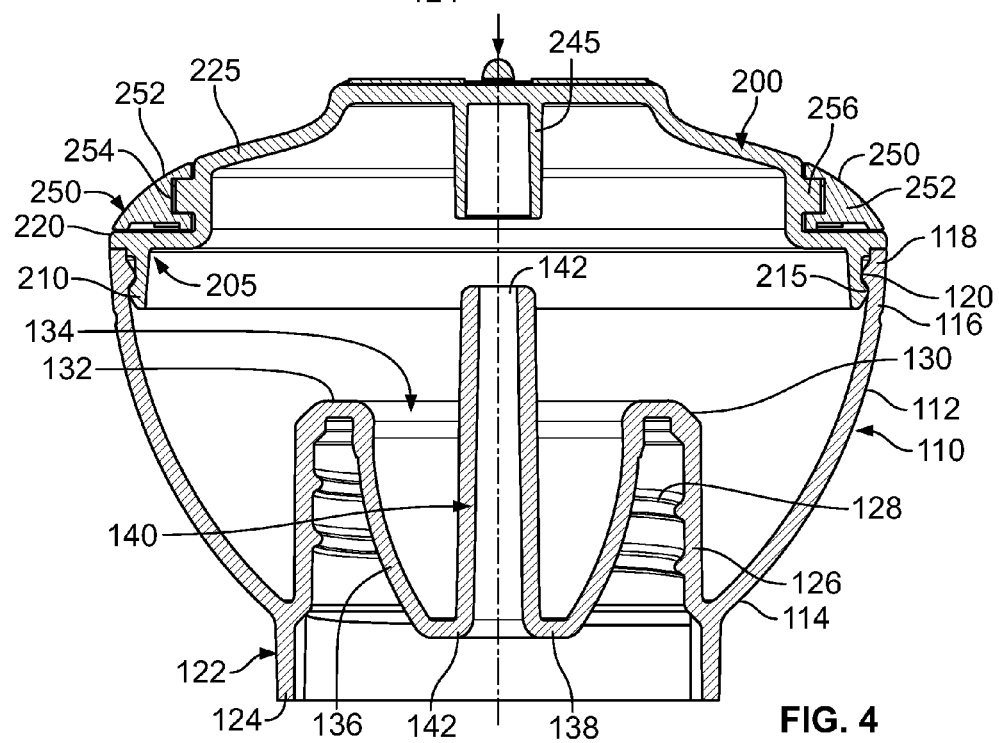
FIG. 4 is a enlarged cross section view of a bowl attachment in accordance with an embodiment of the present invention.
Figure 5A:
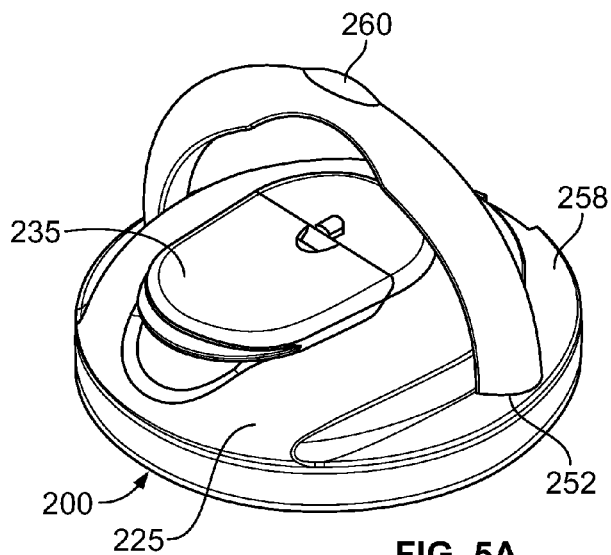
FIGS. 5A through 5C are perspective views of a cover portion to the bowl attachment illustrating the movement of a handle in accordance with an embodiment of the present invention.
Figure 5B:
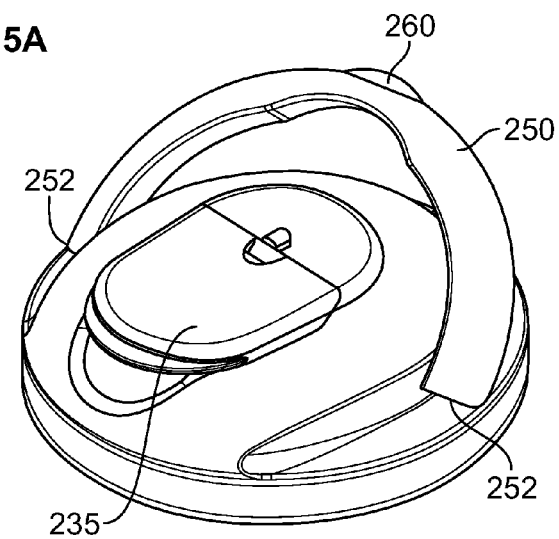
Figure 5C:
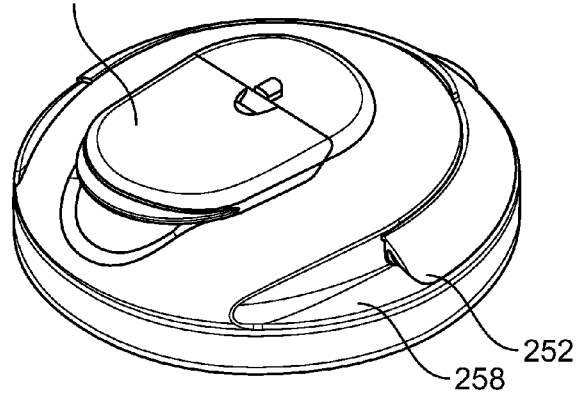
Figure 6A:
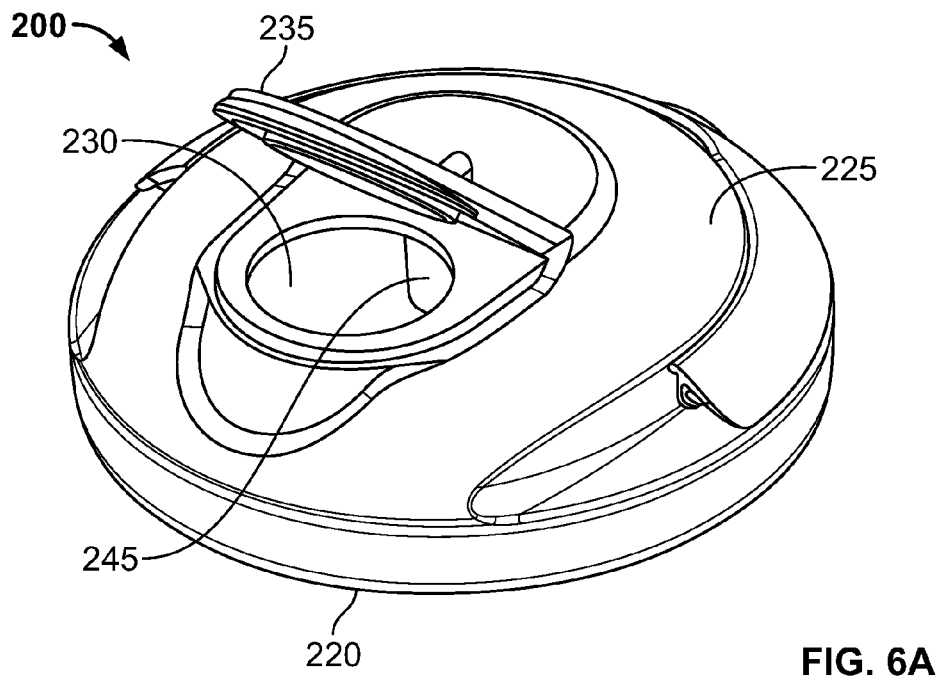
FIGS. 6A and 6B are perspective views of a cover portion to the bowl attachment illustrating the movement of a flip top lid in accordance with an embodiment of the present invention.
Figure 6B:
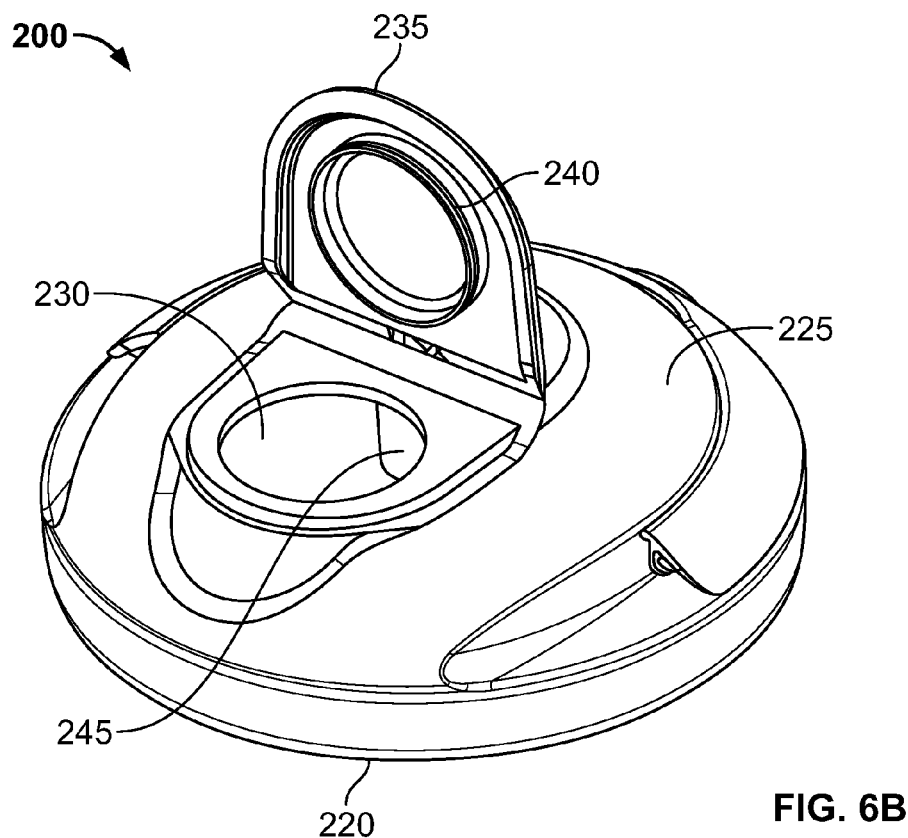
Figure 7B:
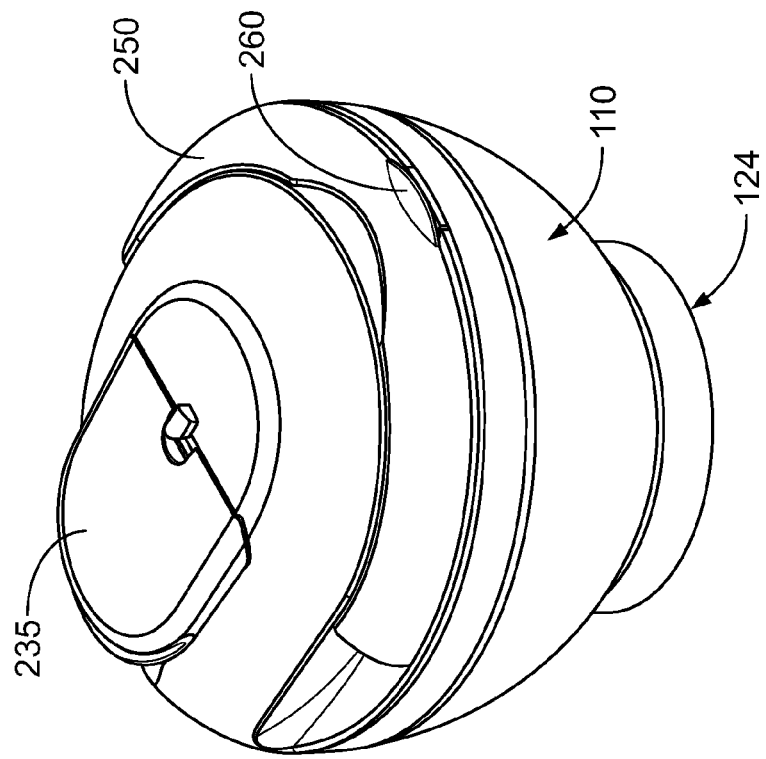
FIGS. 7A and 7B are perspective views of an assembled bowl attachment in accordance with an embodiment of the present invention.
Figure 7A:
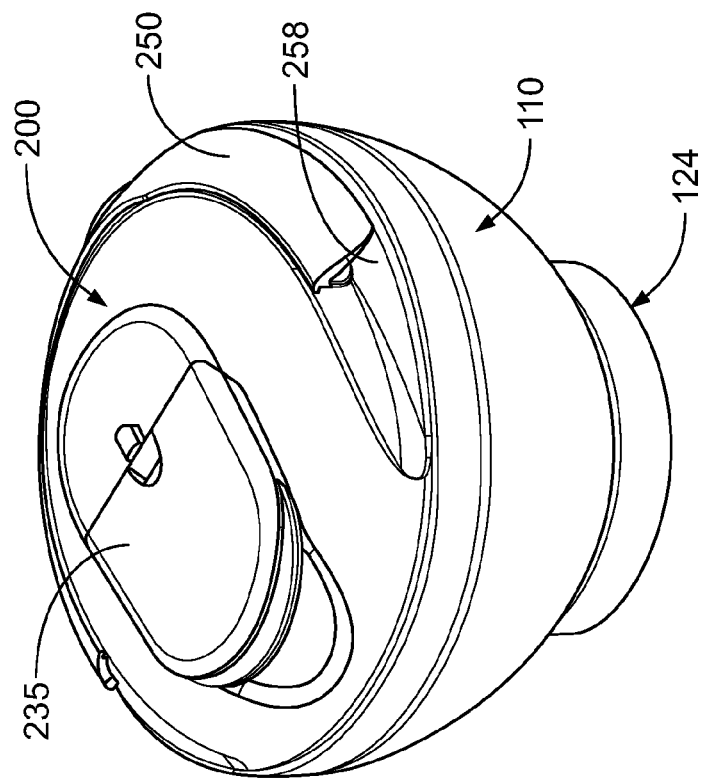

In cross section views, FIGS. 2 and 4, the main bowl portion 110 includes a continuous wall section 112. The wall section 112 is outwardly bowed and has a lower end 114 and an upper end 116. The upper end 116 terminates to an upper terminus 118 that includes a lip 120, which bulges inwardly towards the center of the main bowl portion 110. The lower end 114 terminates to a connection section 122.

The connection section 122 includes an annular bottom end 124 positioned below the lower end 114 of the main bowl portion 110 and an upper end 126 extending upwardly from the lower end 114 and internally to the main bowl portion 110. The connection section 122 includes a threaded member 128 defined to mate with the external threads on the neck 15 on the bottle 10. The upper terminus end 130 of the upper end 126 turns inwardly to define a first annular rim 132. The first rim 132 then turns downwardly into a well 134. The well 134 includes an outwardly bowed surface 136, which extends to a second annular rim 138, which is positioned beneath the first rim 132. The second rim 138 extends inwardly towards a lower edge 142 of a spout 140, or a tube. The spout 140 is hollow and extends upwardly towards the cover portion 200. As such, when threaded and connected to a bottle containing fluid, the bottle can be squeezed causing the fluid to travel through the spout 140 and eject from the opening 142 in the spout and into the interior of the main bowl portion 110 created by its continuous wall section 112.

The cover portion 200 secures to the main bowl portion 110 be any number of attaching means, such as a snap fit (as shown in the figures) or corresponding threaded means (not shown, but well known in the industry). The cover portion 200 includes a lower section 205 that has a lower extending skirt portion 210. The skirt portion 210 has a bead 215 protruding outwardly such that the skirt portion 210, or more correctly the bead 215 snap fits under the lip 120. The lower section 205 further includes an annular ring 220 extending outwardly therefrom to form over the upper terminus 118 of the continuous wall section 112. From the annular ring 220 the cover portion 200 includes a top section 225 with an aperture 230 positioned off center of the top section 225. The top section 225 further includes a hinged flip top lid 235 that is hinged to the top section 225 and includes an annular downwardly extending flange 240 that when the flip top lid 235 is in a closed positioned the annular downwardly extending flange 240 engages the aperture 230 and frictionally closes the top section 225. In an opened position, the aperture 230 exposes the interior of the main bowl portion 110 allowing the user to dump the contents either directly from the bottle or contents held in the main bowl portion 110. In addition, the cover portion 200 can be removed allowing the consumer to remove contents directly from the main bowl portion 110. In addition, extending downwardly from an interior surface of the top section 225 is a protruding member 245. The protruding member 245 is positioned to align over the spout 140, but not to block the spout. The protruding member 245 helps to deflect the fluid ejecting from the spout in order to help prevent the flip top lid 235 from opening inadvertently when the use squeezes the bottle. As such the aperture 230 is off center from the downwardly protruding member 245.

As previously noted, a pivotal handle 250 may also be provided and attached to the cover portion 200. The handle 250 has an arcuate shape with a pair of terminal ends 252 that include detents 254. The detents 254 secure to tabs 256 extending on either side of the cover portion 200. The cover portion 200 may include a ledge portion 258 shaped similarly to the handle to permit the handle 250 to rest on the ledge portion 258 when positioned against the cover portion 200. The handle 250 may also include a centrally located protruding lip 260 that allows the consumer to lift the handle 250 by the lip away from the ledge and then to a position that the consumer may grasp the handle 250.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A bowl attachment for use in connection with a bottle having a threaded opening and configured to contain a fluid, the bowl attachment comprising:
    a main bowl portion having:
        a connection section configured with a threaded section to secure to the threaded opening of the bottle
        a continuous wall section extending upwardly from a lower portion of the connection section and shaped as a bowl, the continuous wall section further including an upper terminus end with a lip bulging inwardly into the bowl;
        an interior well connected to an upper portion of the connection section;
        a spout connecting to the interior well, the spout having a hollow interior such that contents of the bottle are capable of entering the main bowl portion through the spout; wherein the upper portion of the connection section includes a first rim extending inwardly to connect to the interior well and the interior well having a second rim extending inwardly to connect to a lower portion of the spout;
    a cover portion having:
        a lower section has a lower extending skirt portion, the lower extending skirt portion includes a bead defined to snap fit below the lip of the upper terminus end of the continuous wall section, and the lower section has an annular ring extending outwardly therefrom, the annular ring positioned to lay adjacently over the upper terminus end of the continuous wall section;
        a top section having an aperture positioned therethrough; and
        a hinged flip top lid having an annular downwardly extending flange to frictionally engage the aperture when the flip top lid is in a closed position.

2. The bowl attachment of claim 1, wherein the cover portion further includes a protruding member extending downwardly from an interior surface of the top section and aligned over the spout.

3. The bowl attachment of claim 1, wherein the spout has an upper opening positioned above the interior well.

4. The bowl attachment of claim 1 further comprising: a handle having a pair of terminal ends, each end being pivotally connected to the cover portion such that the handle is pivotally secured to the cover portion.

5. The bowl attachment of claim 4, the cover portion further including a ledge grooved into the upper portion of the cover portion and a pair of tabs extending outwardly at a position adjacent the ledge, the handle further including a pair of terminal ends, each end including a detent sized to receive one of the tabs, such that when the handle is connected the handle may pivot about the tabs and lay in a rest position against the ledge.

6. The bowl attachment of claim 5, the handle further includes a protruding lip.

* * * * *